United States Patent [19]

Alldredge

[11] 4,246,119

[45] * Jan. 20, 1981

[54] LIQUID SAND FILTER

[76] Inventor: Robert L. Alldredge, 130 Pearl, Apt. 1108, Denver, Colo. 80210

[ * ] Notice: The portion of the term of this patent subsequent to Feb. 13, 1996, has been disclaimed.

[21] Appl. No.: 11,444

[22] Filed: Feb. 12, 1979

[51] Int. Cl.³ ............................................. B01D 23/24
[52] U.S. Cl. ................................... 210/279; 210/290; 220/85 B
[58] Field of Search ................. 210/97, 106, 133, 196, 210/250, 266, 274, 277, 279, 286, 290, 291, 293, 350, 435; 220/85 B

[56] References Cited

U.S. PATENT DOCUMENTS

| | | | |
|---|---|---|---|
| 620,621 | 3/1899 | Veazie | 210/250 |
| 4,139,473 | 2/1979 | Alldredge | 210/279 |

*Primary Examiner*—William F. Smith
*Assistant Examiner*—Ferris H. Lander
*Attorney, Agent, or Firm*—Kyle W. Rost

[57] ABSTRACT

An upwash sand filter with a diaphragm hold-down for the granular filter media during filter stage is operable with self-graded coarse-to-fine media for upflow filtration, downflow filtration, or combined up and down flow to a central exit filtration. The media is held in place by a diaphragm that may be a perforated plate for allowing liquid to pass through the perforations, and in the downflow embodiment, the media column is supported on another perforated wall or plate to allow a final lower layer of coarser media to be used so that the plate itself is not the finest layer of the filter. In the upflow embodiment, a coarser top layer is employed for this same purpose. The diaphragm serves in all embodiments to prevent loss of media and avoid channeling through the media thereby allowing exceptionally high filter rates.

10 Claims, 3 Drawing Figures

LIQUID SAND FILTER

CROSS-REFERENCE TO RELATED APPLICATION

Copending U.S. patent application Ser. No. 832,221, now U.S. Pat. No. 4,139,473 filed Sept. 9, 1977, is incorporated by reference herein for teachings and details of filter construction and operation.

BACKGROUND OF THE INVENTION

1. Field of the Invention

The invention relates to liquid purification and to filters employing granular filter media, with self-graded media during upwash of the filter. A perforated diaphragm hold-down permits high capacity upflow filtration, downflow filtration, and combined up and down flow filtration. The media is selected for settling velocities that allows desired gradation to be achieved, often with a coarse layer at the exit side of the media to permit screen hold-down without causing the screen to be the finest filter layer.

2. Description of the Prior Art

Sand filters are well known as filtering devices for water and many other liquids. Several configurations of sand filters are well known, including down-flow filters and up-flow filters.

Down-flow filters represent the simplist form, consisting of a tank containing a filtering medium such as sand and having a top inlet for pressurized water and a bottom outlet for filtered water. Where the filtering medium is sand, the sand will be of various sizes. To remove the accumulated dirt from the sand, water is pumped up through the sand at a velocity sufficient to lift the sand and roll it around. At the conclusion of washing, the sand settles naturally and, accordingly, is graded in the filter with the fastest settling particles at the bottom and the slowest settling particles at the top. If all particles are of substantially the same material, the largest particles are at the bottom of the filter and the smallest are at the top. When the filtering operation is taking place, the finest particles in the liquid are filtered out by immediate contact with the finest particles of said at the top of the filter, and the remaining solids merely build up on the top of the filter. Very little material is caught in the bed of sand.

Typical operating conditions for a standard down-flow sand filter are flow rates of ½ to 1½ gpm/sq. ft. of cross section and a dirt holding capacity of ¼ to 1 lb.sq. ft. of cross section. Most of the pressure drop is due to passage across the thin layer of filtered solids in the upper bed of the filter.

Representative art teaching down-flow filters includes U.S. Pat. Nos. 184,024 to Stewart, 178,972 to Stewart, and 454,340 to Fulton.

The disadvantages of down-flow filters have suggested that an up-flow filter is a far more practical filtering device, but up-flow filters present a number of problems. The greater efficiency of an up-flow filter is attributed to the same classification of particles that occurs in the washing cycle of down-flow filters: the largest particles of sand settle to the bottom of the filter and the smallest at the top. Then, as the liquid to be filtered is pumped into the sand from the bottom, the coarser impurities are trapped in the coarser layer of sand and the finer impurities pass into finer layers of sand before being trapped.

Typical operating conditions for the standard up-flow sand filter are flow rates of 8-12 gpm/sq. ft. cross section and dirt holding capacities of up to 10 lb./sq. ft. cross section. The filterable solids are distributed throughout the sand and the pressure drop is likewise distributed across the entire body of sand. Thus, if the sand can be held in place, the flow rates can be much higher than in a down-flow filter for the same pressure drop.

A number of attempts in the prior art have faced the problem of holding the sand in place during high filtering rates in an up-flow filter. U.S. Pat. No. 620,621 to Veazie teaches containing the sand layer between an upper and lower foraminous diaphragm, with the upper diaphragm being connected to a device for applying pressure to sand layers to hold the sand particles close together for efficient filtering. U.S. Pat. No. 3,278,031 to Rosaen teaches a piston arrangement for compressing the filtering medium under a perforated plate, and the pressure of the piston is released to allow medium to expand for washing. U.S. Pat. No. 2,723,761 to Van Der Made et. al. teaches an up-flow filter that routes some of the liquid to the top of the filter to supply compacting pressure to the bed of filtering media. U.S. Pat. No. 3,202,286 to Smit teaches the use of an open grate across the top of the filtering media to hold the media in place through natural bridging between elements of the grate.

A problem found in prior art up-flow filters is that the filter rate is limited by the need to hold the top layers of the filtering media in place. The foraminous devices used on the upper layer of the media in the Veazie, Rosaen, and Smit patents will yield some of the filter material through the perforations of the hold-down device if the flow rate is high enough. Alternatively, if the hold-down device is pressurized to oppose high filter rates, as in the Van der Made et al. patent, there is danger that the pressurized water will channel to the filtrate outlet, and all filtering action will immediately cease. If a mechanical hold-down device is created with small enough perforations to physically retain the filter media against high pressure without bridging of the media particles, the hold-down device itself may become the finest layer of filtering media and be subject to rapid clogging, or the upper layer of media may be required to be coarse enough that extremely thorough filter action cannot be achieved.

A further problem exists in cleaning an up-flow filter. It is desirable to loosen the beds of the filter media and suspend each particle so that it can move freely, thereby releasing dirt trapped in the interstices. To accomplish this task in apparatus such as that taught in the Smit patent, it is necessary to use wash flow rates greater than filter flow rates, often requiring a separate wash pump for the task and often requiring air in the wash liquid to lift the media. Furthermore, in all prior up-flow up-wash graded filters, the wash rate is limited according to the rate that will lift the finest particles of the filter media completely out of the filter housing. During an up-wash process, the finest media particles form a visible plane at the top of the wash flow, and the adjustment of flow rates between a rate that will retain the particles and a rate that will wash the particles away must be carfully controlled.

Ideally, the filter media should be cheap and readily available, with sand being a preferred material. In the up-wash process, it is known that the media will be self-sorting into layers graded according to the size of the particles when all particles are of similar density, the larger particles settling at the bottom of the filter and the smaller particles at the top. If in rinsing the filter the finest particles are to be retained and not blown out the top of the filter with the dirt, then there is an additional limitation that the largest particles must be of sufficiently small size that they can be lifted and suspended in the wash water while the wash flow rate is maintained below the rate that will remove the finest particles from the top of the filter. Ordinarily, the settling rates of various sized particles of similar density are such that maximum size ratio between the largest and smallest media particles is approximately 3:1, which is not a very great range.

The present invention seeks to solve these and other problems of the prior art, as will be disclosed below.

SUMMARY OF THE INVENTION

A sand filter with a diaphragm hold-down on top of a substantially vertical column of filter media is operable at unusually high filter rates. Sand or other granular filter media is automatically graded during upwash of the column, due to the close range of settling velocities of the various media particles. In an upflow embodiment, the lower layer of media is coarse, while upwardly successive layers become increasingly fine, and all of these layers may be of similar density. The range of fineness is then substantially increased by employing upper layers of further increasing fineness with greater density or specific gravity than found in the lower layers. Finally, the top layers become coarser than the upper fine layers, and have much lighter density or specific gravity. These top layers act as a foraminous retainer for the underlying fine layers, and may be held in place by a relatively coarse screened or apertured diaphragm, which then is not the finest layer in the filter media column. In a downflow embodiment, the self grading of the layers is retained by employing lower layers of very fine, very dense media, with successive upper layers having increasing coarseness and decreasing specific gravity. Since a downflow filter may employ a perforated screen or plate as a lower wall, a lowest layer of coarse, dense material serves as a foraminous separator between the finest layer and the screen or plate. Through proper selection of media, the reverse grade of the downflow media column can be automatically achieved during upwash. Finally, the media column may employ a filtrate outlet in one of the central, fine layers, and dirty liquid may then be pumped into the filter through both top and bottom, each of which has a coarse layer of media. In all cases, the diaphragm prevents the media from washing away under high filter rates, and also prevents channeling from the inlet end of the column to the outlet, which would destroy all filter action. The housing may be flared upwardly in the lower housing portion normally containing the media column during filter stage for improved dirt holding capacity and better separation of the layers during upwash. Above the lower portion is an upper portion that is even more broadly flared for reducing upwash fluid velocity and thereby allowing greater upwash rates without washing the finest upper layers of media out of the filter housing.

An important object of the invention is to increase the size range of media particles without increasing the range of settling velocities.

Another important object is to increase the size range of media particles without reducing the rate of filtration or requiring careful control of the wash rate to prevent loss of the finest particles through the dirty water overflow.

A further object is to create a filter that permits extremely high rates of filtration through media that is automatically graded from coarse to fine in the direction of filtration during wash stage.

Still another object is to create a graded media column that may employ extremely fine granular media held down or held in place by a perforated plate or screen without causing the screen to become the finest layer of the filter.

DESCRIPTION OF THE PREFERRED EMBODIMENT

Figure 1:
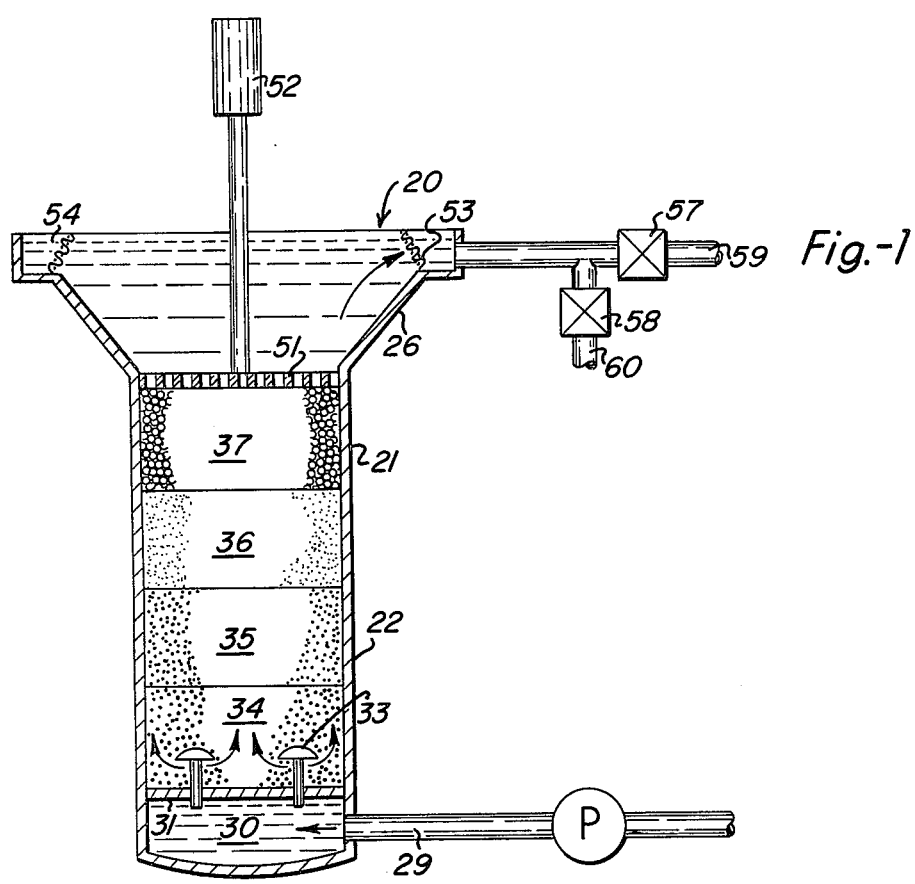
FIG. 1 is a vertical cross-sectional view of the filter in the embodiment for upwash and upflow.
Figure 2:
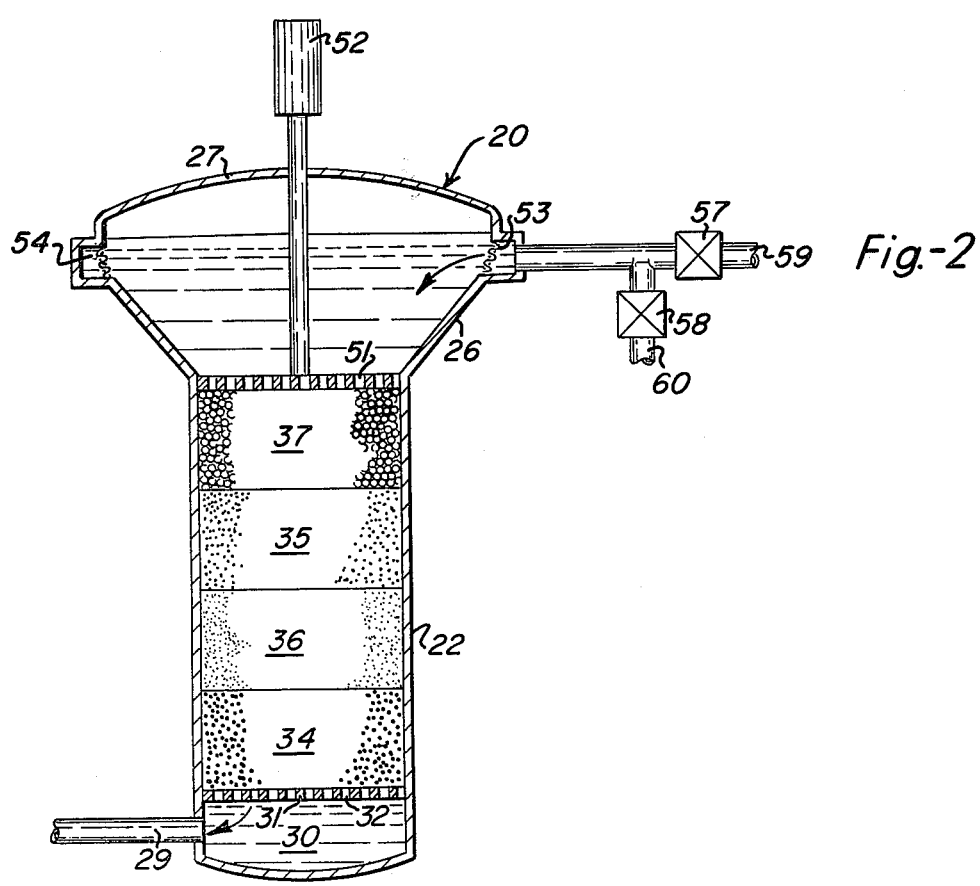
FIG. 2 is a view similar to FIG. 1 showing the filter in the embodiment for upwash and down flow.
Figure 3:
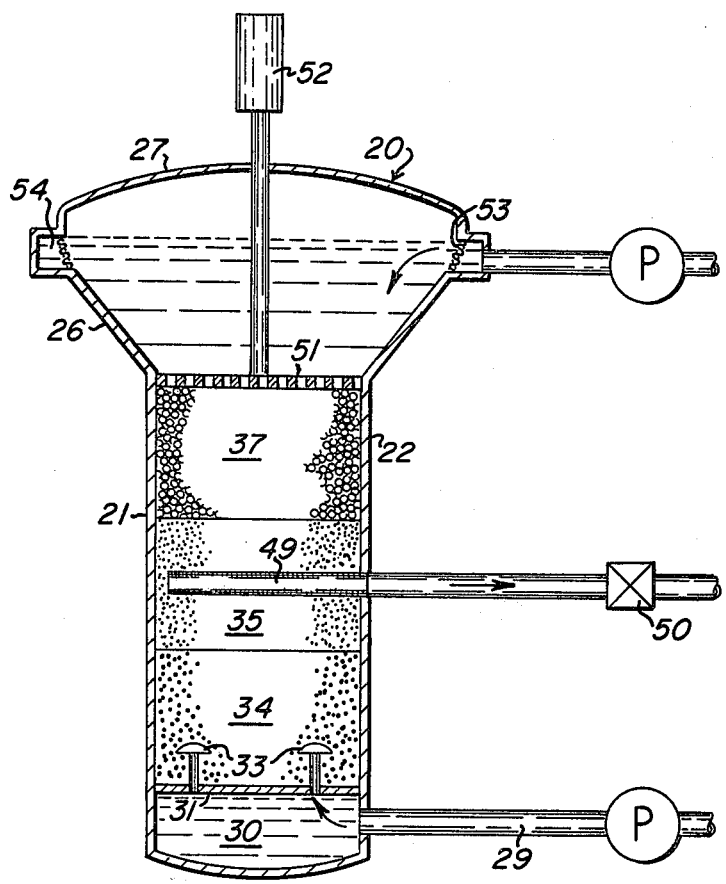
FIG. 3 is a view similar to FIG. 1, showing the filter in the embodiment for upwash and combined up and down flow.

The invention is initially shown in FIG. 1 to be a sand filter 20 having a housing 21 that includes a lower housing 22 and an upper housing 26. The upper housing may have an open top, or the top may be closed by a dome 27 as shown in FIGS. 2 and 3. At the bottom of the filter 20 is a conduit 29 adapted to bring dirty liquid into the filter, or in the appropriate case, to remove filtrate. In all embodiments, the passageway 29 serves as an inlet for wash liquid during wash stage. The inlet 29 communicates with a lower chamber 30 in the lower housing 22, and a filter media supporting wall 31 at the top of chamber 30 supports the bottom of the column of filter media. In FIGS. 1 and 3, wall 30 carries a plurality of liquid distributors 33 thereon, while in FIG. 2 the plate has perforations 32 or may be screen-like in construction.

A column of filter media extends upwardly from the plate and within the walls of the lower housing 22. A series of contiguous layers of media, each of defined coarseness and density or specific gravity, are found in layered arrangement. Referring again to FIG. 1, the lower layer 34 may be gravel or similar coarse, dense media; the layer 35 above the gravel may be sand, which would be finer than the gravel but of approximately the same specific gravity; above the sand is a finer, denser layer 36 such as fine magnetite or garnet, which would have a greater specific gravity than the sand or gravel; and optionally the media column may have a top layer 37 of coarser, lower density material than the finest layer 36. For example, the top layer may be plastic beads of polystyrene or of any other suitable material. All of the filter media would be contained within the lower housing 22 during filter stage, and the lower housing may have straight parallel sides or slightly upwardly flared sides through the portion containing the media. The flare would result in a gradually increasing cross-sectional area in the lower housing with increasing height, with the result that dirty liquid passing up through the filter would travel increasingly slowly and allow the entrained dirt to settle out in the interstices of the media during filter stage. In addition, the greater cross-sectional area of the finer layers 35 and 36 increases the dirt holding capacity of these layers before the pressure drop in the media column is so great that cleaning is required. The size ratio between the finest media of layer and the coarsest media of layer 34 may be increased by adding additional layers of finer, denser material to layer 36. The coarseness of layer 37 is preferably similar to that of layer 35, although the coarseness could be increased by adding additional layers of coarser, increasingly lighter media to layer 37.

The upper housing 26 extends from the top of housing 22 and flares upwardly to a substantially greater degree than any flare in housing 22. The media ordinarily only enters the upper housing during wash stage, when the upward flow of wash water suspends the media grains and frees the captured dirt. Ordinarily, if all media particles were of equal density, the fine particles would be raised above the coarse in proportion to fineness, and the coarse particles would have the highest settling velocities and would settle to the bottom of the column at the conclusion of the wash stage. The wash liquid must be controlled in velocity to prevent the finest or uppermost media from being washed away. The flare of housing 22 reduces the velocity of the wash liquid to a small degree with increasing height, aiding the finer media raised to the upper portion of housing 22 to be retained in the filter. The greater flare of upper housing 26 substantially reduces the velocity of the wash liquid, aiding the very finest media to be retained in the filter and allowing greater wash liquid velocities, or alternatively, permitting a broader ratio of particle sizes to be employed in a single filter where all media from coarse to fine are to be suspended in the wash liquid for cleaning purposes. The flare of housing 26 also makes the precise adjustment of wash flow rates less critical.

During filter stage, the filtrate is ordinarily removed from the finest layer of filter media, as by a perforated tube 49 shown in FIG. 3 to extend from the housing wall into the layer 35. The outlet for filtrate may be closed by a suitable valve 50 when the filter is to be washed. To enable the dirty liquid to be passed through the filter at a high rate of greatest efficiency during filter stage, a reuseable diaphragm is contained in the upper housing 26 and may be applied to the top of the column of filter media to compress the media with whatever force is required to hold the media in place against the upward flow of water. In the illustrated embodiments, the diaphragm is a perforated or screened plate 51 that is mechanically applied to the media column or retracted therefrom by means of an actuator 52, which may be a pneumatic or hydraulic cylinder attached to the housing 21. Where such a perforated diaphragm is used, the liquid may pass through the apertures of the diaphragm in either direction. During filter stage, the filtrate may pass upwardly through the diaphragm and into the flared housing 26 of FIG. 1, where the liquid will eventually flow through retaining screen 53 and out liquid overflow 54, which may be an annular collection chamber encircling the open top end of the upper housing. The clean liquid then passes out through valve 57 and conduit 59, while valve 58 is closed, sealing conduit 60. When coarse less dense layer 37 is employed in the filter media, the perforations in the plate or screen 51 are fine enough to retain the coarse beads of layer 37, but the perforations are coarser than the fineness of layer 36 so that the screen is not the finest layer of media. Thus, there is very little tendency for the screen to scum-over or capture dirt from the filtrate.

During upwash stage, the diaphragm is withdrawn by the actuator 52 to a higher position in the upper housing, freeing the media to be lifted by the upwash water. Wash rate may be less than filter rate since the media are not artificially restrained during wash. Hence, the same pump P used for filter stage may be employed for wash stage. The wash water and entrained dirt are carried through screen 53 and into collection chamber 54, where the dirty water passes through the now opened valve 58 and conduit 60, while valve 57 seals conduit 59. The screen 53 may be of mesh similar to the mesh of the diaphragm so that coarse, less dense particles of layer 37 will be captured if the wash rate should raise them to the level of the outlet 54.

During upwash stage, the embodiment of FIG. 2 is identical in operation to FIG. 1, but during filter stage the embodiment of FIG. 2 is distinct in that flow is downward. Thus, the dirty liquid enters through conduit 59, valve 57, and liquid chamber 54 into upper housing 26, where the liquid passes through the coarse openings of the diaphragm and down through the column of filter media, exiting through the coarse openings of plate 31 into chamber 30 and out liquid conduit 29. Suitable valves may be applied to the conduit 29 to provide for one routing for the filtrate and another routing for the reverse flow of upwash water, or a pump P may force filtrate back through the conduit 29 for upwash, routing the wash water out conduit 60. In the down flow embodiment of FIG. 2, the self-grading of the filter media during upwash is preserved. The top layer 37 remains coarse, light weight beads, although the coarseness may be substantially greater than is required in the upflow embodiment of FIG. 1. Below layer 37 is a finer, denser layer 35, which again may be a synthetic or plastic material, or a light density sand. Below this is a still finer, denser layer 36 such as magnetite. The bottom layer 34 may be gravel or other coarse, dense material to form a foraminous separator between the finest layer 36 and the bottom perforated wall 32. The coarse gravel in the downflow embodiment prevents the wall 32 from requiring extremely fine apertures 32 that would be the finest filter media. During downflow filtration, the dirty water may be pumped or drawn through the filter at extremely high rates because the diaphragm holds the filter media in place with whatever force is required to prevent channeling, which has presented a serious problem in non-compressed downflow sand filters.

In FIG. 3, the granular filter media is again self-grading during upwash to the desired configuration of layers, but during filter stage the dirty water is pumped from both the top and bottom of the column to a central exit. At the bottom of the filter, the media is supported by wall 31 having liquid diffusers 33, as in FIG. 1. The bottom layer 34 is coarse gravel to capture the largest impurities in the water. Above this is finer layer 35, which may be sand. Coarse, less dense layer 37 then is at the top of the column, held in place by the diaphragm screen 51. Dirty liquid enters through lower inlet 29, flows through coarse layer 34 and fine layer 35 to central perforated tube 49, and dirty liquid also enters through chamber 54 into the upper housing and flows down through the apertures of the diaphragm, coarse layer 37 and finer layer 35 to outlet 49. The opposing flow rates create a balanced filter that places less stress on the diaphragm, but at the same time the diaphragm is required to compress and contain the media as in each of the above embodiments. The number of layers and fineness of the granular media may be expanded as desired, while maintaining the self-grading quality.

While the term "sand filter" has been applied to the invention, it should be understood that this denotes a type of filter employing granular media, whether that media is sand or other material. The type of apertured plate or screen diaphragm here described has the advantage of being mechanically stronger than a flexible, impervious diaphragm as described in my co-pending patent application Ser. No. 832,221, and is therefore better able to withstand high pressures of application against the filter media, although a soft, foldable or flexible diaphragm could be employed in the above disclosed embodiments as well.

With regard to specific choices of material for the various layers of filter media, it is desirable to assure that a specific size of material is maintained within its designated layer. Therefore, when a desired grade of media has been selected, such as a desired coarseness of sand, the sand may first be screened to obtain the proper size, and the properly sized sand may then be placed in a uniformly flowing liquid stream, with the result that grains of lowest density will be carried furthest in the stream. In this manner, a collection of like size, like density grains is obtained. The same sorting procedure in a liquid stream can be applied to select media for adjacent layers in the filter column, as the settling velocity of the various media is revealed by the distance each coarseness and density of material is carried in the stream.

I claim:

1. An improved upwash, self-graded sand filter of the kind having a column of granular filter media held in a stationary position during filter stage and graded from coarse to fine in the direction of filtration, and a filter housing containing the filter media within the bottom and sides of the housing, wherein the improvement comprises:
   (a) wash liquid inlet means near the bottom of said granular filter media in the housing for supplying wash liquid to lift the granular filter media;
   (b) wash liquid outlet means in said housing above said stationary position of the filter media during filter stage for removing dirty wash liquid;
   (c) reusable diaphragm means moveable between an applied position against the top of said filter media column during filter stage for compressing and holding the filter media in place, and a release position during wash stage above the stationary position of the filter media in filter stage for allowing the media to be lifted by the upflow of liquid from said inlet means; and
   (d) actuator means for holding the diaphragm in applied position during filter stage and releasing the diaphragm from the column of filter media during wash stage.

2. The filter of claim 1, wherein said column of granular filter media comprises a lower layer of relatively coarse media having defined specific gravity, and an upper layer of relatively finer media having defined specific gravity such that the settling velocity of the upper layer is less than that of the lower layer for automatic coarse to fine upward gradation following upwash of the media; and said diaphragm comprises a perforated member for receiving liquid through the perforations thereof during filter stage.

3. The filter of claim 2, further comprising above said upper layer a top layer of granular filter media that is relatively coarser and of lighter specific gravity than said upper layer such that the top layer is self-grading during wash stage above the upper layer, and said perforated member has perforations smaller than the grade of the top layer and larger than the grade of the upper layer.

4. The filter of claim 3, further comprising a perforated tube connected to said filter housing and extending into said upper layer of filter media for receiving filtrate from both the lower and top layers; and means for supplying dirty liquid to said lower and top layers of filter media for mutual flow toward said upper layer during filter stage.

5. The filter of claim 1, wherein:
   (a) said column of filter media comprises a top layer of relatively coarse media having defined specific gravity, and a lower layer of relatively finer media of greater specific gravity than said top layer such that the settling velocity of the lower media layer is greater than the settling velocity of the top media layer for natural gradation of the lower layer under the top layer after upwash of the media column; and
   (b) a perforated bottom suport wall under the media column for allowing passage of filtrate;
   (c) means supplying dirty liquid to the top layer of the media column; and
   (d) means for removing filtrate from the filter housing below said bottom support wall.

6. The filter of claim 5, wherein said diaphragm comprises a perforated member for receiving dirty liquid through the perforations thereof during filter stage.

7. The filter of claim 5, wherein said dirty liquid supply means is located in the filter housing above the level of the perforated member in applied position.

8. The filter of claim 5, wherein said column of filter media further comprises under said lower layer a bottom layer of media coarser than the lower layer and of greater specific gravity than said top layer such that the bottom layer is self grading to the bottom of the column during upwash.

9. The filter of claim 1, wherein said filter housing comprises a lower housing portion containing the filter media in said stationary position during filter stage, and an upper housing portion contiguous with the lower housing and having an upward flare for reducing the upward velocity of wash liquid during wash stage.

10. The filter of claim 9, wherein said lower housing portion flares upwardly to a lesser degree than said upper housing portion.

* * * * *